(12) United States Patent
Noble et al.

(10) Patent No.: US 7,552,817 B2
(45) Date of Patent: Jun. 30, 2009

(54) AUGER AIRLOCK ASSEMBLY AND END DUMP HOUSING

(75) Inventors: Max Noble, Swift Current Saskatchewan (CA); Frank Rempel, Swift Current Saskatchewan (CA)

(73) Assignee: REM Manufacturing Ltd., Swift Current (CA)

( * ) Notice: Subject to any disclaimer, the term of this patent is extended or adjusted under 35 U.S.C. 154(b) by 368 days.

(21) Appl. No.: 11/399,295

(22) Filed: Apr. 6, 2006

(65) Prior Publication Data

US 2007/0163859 A1    Jul. 19, 2007

(30) Foreign Application Priority Data

Jan. 18, 2006    (CA) ..................................... 2533244

(51) Int. Cl.
    *B65G 33/22* (2006.01)
(52) U.S. Cl. ....................................... 198/671; 406/180
(58) Field of Classification Search ................. 198/671, 198/502.2, 550.2; 406/176, 180
    See application file for complete search history.

(56) References Cited

U.S. PATENT DOCUMENTS 3,315,792 A  *  4/1967  Tyndall .................... 198/860.4
3,382,967 A     5/1968  Mayrath
3,447,669 A  *  6/1969  Mayrath ..................... 198/525
3,498,483 A     3/1970  Meharry
4,415,303 A    11/1983  Westendorf et al.
5,348,138 A  *  9/1994  Seemann ..................... 198/671
5,669,531 A  *  9/1997  Hagemeyer ............. 222/153.14
6,691,861 B2 *  2/2004  Reimer et al. ............... 198/534

* cited by examiner

*Primary Examiner*—Mark A Deuble
(74) *Attorney, Agent, or Firm*—Katten Muchin Rosenman LLP

(57) ABSTRACT

An auger airlock assembly and end dump housing having a spring loaded bottom for use in a bulk loader which utilizes a source of negative pressure to create a suction air stream that draws particulate materials into the loader for transfer, via the auger assembly, to a location remote of the loader. Materials exiting the auger assembly accumulate within the housing to a point wherein, once the accumulated material has acquired a certain weight, the bottom of the housing is forced open to permit discharge of the material, and, once the material is removed, and is not present in enough quantity to maintain the bottom of the housing to remain open, the spring loaded connection biases the bottom back into a position sealably closing the housing. The bottom of the housing may also be opened by the auger feeding more material into an already full housing, whereby the material is compressed so as to force the door open. Side portions of the housing limit the opportunity for outside air to enter the airlock assembly during the discharge of materials, maintaining the vacuum suction created by the negative pressure in the auger assembly.

5 Claims, 6 Drawing Sheets

AUGER AIRLOCK ASSEMBLY AND END DUMP HOUSING

FIELD OF THE INVENTION

This invention relates to an auger airlock assembly and end dump housing for bulk loaders, and, more particularly, to an auger airlock assembly and end dump housing for use in a bulk loader which utilizes a source of negative pressure to create a suction air stream that draws particulate materials into the loader for removal by an auger to a location remote from the loader.

DESCRIPTION OF THE PRIOR ART

Generally speaking, prior auger assemblies include an elongated barrel or tube presenting a material inlet and a material outlet spaced from the inlet, with an elongated, axially rotatable, material-conveying auger screw positioned within the tube. Auger assemblies are often used for conveying materials such as granular agricultural products along a desired path of travel, for example, from the outlet of a cyclone separator to a collection hopper. Further, such machines may also utilize a single stage fan or blower to create suction for the vacuum pickup of the granular materials, in a negative pressure system. In negative pressure systems, appropriate airlock doors, housings, and the like are provided for preserving the integrity of the overall negative pressure system, and to maintain the negative pressure within the loader.

The use of auger airlocks or housings is not new in the industry. However, two related problems have arisen in conventional loader auger airlocks or housings. The first is that materials exiting from the outlet through the airlock doors generally allow, once the airlock door is opened for the removal of materials, outside air to enter into the barrel or tube, which weakens the vacuum and suction effect. Conventional airlock doors, once opened, allow for materials to be discharged downwardly from the end of the discharge port, but also to be discharged and directed out to sides of the discharge port once exiting the auger assembly, thus allowing outside air to enter from the sides into the barrel or tube. The second further problem stems from the possibility, once outside air has entered into the barrel or tube of the auger assembly, is that material being transported by the auger to be exited can be blown back down the auger assembly, resulting in what is commonly known as "blowback". When this occurs, it is not uncommon for almost all of the vacuum effect created by the airlock to be lost. It will thus be appreciated that both of these problems can impair the negative pressure conditions within the overall system. Hence, there is a real need for an improved, high efficiency auger airlock assembly and end dump housing which can maintain the vacuum suction created by the negative pressure, thereby assuring smooth, trouble-free operation.

There is a further need for an improved auger airlock assembly and end dump housing which, for materials exiting the auger assembly, limits the direction in which materials are to be discharged downwardly from the end of the discharge port, and limits the opportunity for outside air to enter the discharge port from the sides of the port upon the discharge of materials, thus preserving the integrity of the overall negative pressure system and maintaining the vacuum suction created by the negative pressure within the loader. In this regard, the present invention substantially fulfills this need.

SUMMARY OF THE INVENTION

Accordingly, one object of the present invention is to provide an improved high efficiency auger airlock assembly and end dump housing which can maintain negative pressure within the auger assembly and loader.

Another object of the present invention is to provide an improved high efficiency auger airlock assembly and end dump housing which limits the opportunity for outside air to enter the discharge port from the sides of the port upon the discharge of materials, thus preserving the integrity of the loader's overall negative pressure system.

A still further object of the present invention is to provide an improved high efficiency auger airlock assembly and end dump housing wherein the exit door of the dump assembly is forcibly openable only by the weight of materials at the discharge port accumulating to the extent necessary to force open the exit door and permit discharge of the materials, the exit door then being biased back into a position sealably closing the exit door once materials are not present to the extent necessary to maintain the exit door in an opened position.

According to one aspect of the present invention, there is provided a material-conveying end dump housing adapted to cover a discharge end of an auger assembly, the housing comprising a front wall; a rear wall adapted for placement over the discharge end of the auger assembly and defining an inlet port therein, the inlet port being in communication with the discharge end of the auger assembly for discharging material delivered from the auger assembly; a covering wall attached to the front and side walls, wherein a length of side portions of the covering wall exceeds a length of the front wall and the rear wall; a bottom wall having a spring loaded connection to the housing, the bottom wall being operably able to biasingly open or close said housing; and wherein the discharging material entering the housing through the inlet port accumulates within the housing on an upper surface of the bottom wall, the bottom wall being forcibly openable by a presence of the accumulated discharging material on the upper surface of the bottom wall to an extent necessary to force open the bottom wall of the housing and permit gravitational discharge of the accumulated discharging material from the housing, whereby, once the discharging material is removed and is not present to the extent necessary to maintain the bottom wall to remain open, the bottom wall assumes a closed position.

According to another aspect of the present invention, there is provided a material-conveying end dump housing for use with an auger assembly for a bulk loader which utilizes a negative pressure system to generate a suction air stream for vacuuming and propelling granular material to the auger assembly, the housing comprising a front wall; a rear wall adapted to cover an outer end of an auger assembly and defining an inlet port therein, the inlet port being in communication with the outer end of the auger assembly for discharging the granular material delivered from the auger assembly through the inlet port into the housing; a covering wall attached to the front and side walls, wherein a length of side portions of the covering wall substantially exceeds a length of the front wall and the rear wall and excludes substantial entry of outside air through the outer end of the auger assembly during the discharge of the granular material to inhibit diminution of a strength of the suction air stream created by the negative pressure system; a bottom wall having a spring loaded connection to the front wall, the bottom wall being operably able to biasingly open or close the housing; and wherein the discharging granular material entering the housing through the inlet port accumulates within the housing on an upper surface of the bottom wall, the bottom wall being forcibly openable by a presence of the accumulated discharging granular material on the upper surface of the bottom wall to an extent necessary to force open the bottom wall and permit gravitational discharge of the accumulated discharging granular material from the housing, whereby, once the discharging granular material is removed and is not present to the extent necessary to maintain the bottom wall to remain open, the spring loaded connection biases the bottom wall back into a position sealably closing the housing.

A still further aspect of the present invention provides for a material-conveying end dump housing for covering a discharge end of an auger assembly extending outwardly therefrom, the housing comprising a front wall, the front wall having a plurality of securing holes defined therein for receiving securing bolts for attachment of an end of the auger assembly to the front wall, the end of the auger assembly being contained substantially within the housing; a rear wall, the rear wall placed to cover the discharge end of the auger assembly and defining an inlet port therein, the inlet port being in communication with the discharge end of the auger assembly for gravitationally discharging material delivered to the inlet port by the auger assembly; a covering wall attached to the front and side walls, wherein a length of side portions of the covering wall exceeds a length of the front wall and the rear wall; a bottom wall having a spring loaded connection to the front wall, the bottom wall being operably able to biasingly open or close the housing; and wherein the discharging material entering the housing through the inlet port accumulates within the housing on an upper surface of the bottom wall, the bottom wall being forcibly openable by a presence of the accumulated discharging material on the upper surface of the bottom wall to an extent necessary to force open the bottom wall and permit discharge of the accumulated discharging material from the housing, whereby, once the discharging material is removed and are not present to the extent necessary to maintain the bottom wall to remain open, the spring loaded connection biases the bottom wall back into a position sealably closing the housing.

According to yet another aspect of the present invention, there is provided an auger airlock assembly for use with a bulk loader which utilizes a negative pressure system to generate a suction air stream for vacuuming and propelling particulate materials to the auger assembly for transferral to a remote location, the assembly comprising an elongated material-conveying tube for receiving the particulate materials, the tube having an inlet and an inlet spaced from the inlet; an internal auger within the tube, the auger being rotatable about a longitudinal axis of the tube in a direction so as to transfer the particulate materials from the tube to the inlet of the tube; and housing means placed so as to cover the outlet of the tube and defining an inlet port therein for communication with the outlet of the tube for discharging the particulate materials delivered from the internal auger, the housing means having roof and side portions which substantially exclude substantial entry of outside air through the outlet of the tube during the discharge of the particulate materials to inhibit diminution of a strength of the suction air stream created by the negative pressure system, and a bottom wall having a spring loaded connection to a bottom surface of the housing means, the bottom wall being operably able to biasingly open or close the housing means, wherein the discharging particulate materials enter the housing through the inlet port and accumulate within the housing, whereby the bottom wall is forcibly openable by a presence of the accumulated discharging particulate materials on the upper surface of the bottom wall to an extent necessary to force open the bottom wall and permit gravitational discharge of the accumulated discharging particulate materials from the housing, whereby, once the discharging particulate materials are removed and are not present to the extent necessary to maintain the bottom wall to remain open, the bottom wall assumes a closed position.

According to yet another aspect of the present invention, there is provided an auger airlock assembly for use with a bulk loader which utilizes a negative pressure system to generate a suction air stream for vacuuming and propelling granular material to the auger assembly for transferral to a remote location, the assembly comprising an elongated material-conveying tube for receiving the granular material, the tube having an inlet and an outlet spaced from the inlet; an internal auger within the tube and extending outwardly therefrom beyond the outlet of the tube, the auger being rotatable about a longitudinal axis of the tube in a direction so as to transfer the granular material from the tube out through the outlet of the tube; and an end dump housing adapted to cover the outlet of the tube and substantially retaining therein within the housing an end of the auger extending outwardly therefrom beyond the outlet of the tube, the housing comprising a front wall, a rear wall placed so as to cover the outlet of the tube and defining an inlet port therein, the inlet port being in communication with the outlet of the tube for discharging material delivered from the internal auger, a covering wall attached to the front and side walls, wherein a length of side portions of the covering wall substantially exceeds a length of the front wall and the rear wall and excludes substantial entry of outside air through the outlet of the tube during the discharge of the granular material to inhibit diminution of a strength of the suction air stream created by the negative pressure system, a bottom wall having a spring loaded connection to the front wall, the bottom wall being operably able to biasingly open or close the housing, and wherein the discharging granular material entering the housing through the inlet port accumulates within the housing on an upper surface of the bottom wall, the bottom wall being forcibly openable by a presence of the accumulated discharging granular material on the upper surface of the bottom wall to an extent necessary to force open the bottom wall and permit gravitational discharge of the accumulated discharging granular material from the housing, whereby, once the discharging granular material is removed and is not present to the extent necessary to maintain the bottom wall to remain open, the spring loaded connection biases the bottom wall back into a position sealably closing the housing.

According to yet another aspect of the present invention, there is provided an auger airlock assembly for use with a bulk loader which utilizes a negative pressure system to generate a suction air stream for vacuuming and propelling granular material to the auger assembly for transferral to a remote location, the assembly comprising an elongated material-conveying tube for receiving the granular material, the tube having an inlet and an outlet spaced from the inlet; an internal auger within the tube, the auger being rotatable about a longitudinal axis of the tube in a direction so as to transfer the granular material from the tube to the outlet of the tube; and an end dump housing adapted to cover the outlet of the tube, the housing comprising a front wall, a rear wall placed so as to cover the outlet of the tube and defining an inlet port therein, the inlet port being in communication with the outlet of the tube for discharging material delivered from the internal auger, a covering wall attached to the front and side walls, wherein a length of side portions of the covering wall substantially exceeds a length of the front wall and the rear wall and excludes substantial entry of outside air through the outlet of the tube during the discharge of the granular material to inhibit diminution of a strength of the suction air stream created by the negative pressure system, a bottom wall having a spring loaded connection to the front wall, the bottom wall being operably able to biasingly open or close the housing, and wherein the discharging granular material exiting the outlet port of the tube passes through the inlet port into the housing and accumulates within the housing on an upper surface of the bottom wall, the bottom wall being forcibly openable by a presence of the accumulated discharging granular material on the upper surface of the bottom wall to an extent necessary to force open the bottom wall and permit gravitational discharge of the accumulated discharging granular material from the housing, whereby, once the discharging granular material is removed and is not present to the extent necessary to maintain the bottom wall to remain open, the spring loaded connection biases the bottom wall back into a position sealably closing the housing.

According to one further aspect of the present invention, there is provided a material-conveying end dump housing adapted to cover a discharge end of an auger assembly, the housing comprising a front wall; a rear wall adapted for placement over the discharge end of the auger assembly and defining an inlet port therein, the inlet port being in communication with the discharge end of the auger assembly for discharging material delivered from the auger assembly; a covering wall attached to the front and side walls, wherein a length of side portions of the covering wall exceeds a length of the front wall and the rear wall; a bottom wall being hingedly connected to the housing, the bottom wall being operably able to biasingly open or close said housing; bar means, the bar means being connected to and extending between lower portions of each of the side portions, so as to restrict the opening of the bottom wall when discharge of the material from the housing occurs; and spring means, the spring means being connected to and extending between the bar means and the bottom wall; wherein the discharging material entering the housing through the inlet port accumulates within the housing on an upper surface of the bottom wall, the bottom wall being forcibly openable by a presence of the accumulated discharging material on the upper surface of the bottom wall to an extent necessary to force open the bottom wall of the housing, compress the spring means, and permit gravitational discharge of the accumulated discharging material from the housing, whereby, once the discharging material is removed and is not present to the extent necessary to maintain the bottom wall to remain open and compress the spring means, the spring means moves the bottom wall to assume a closed position.

The advantage of the present invention is that it provides an improved high efficiency auger airlock assembly and end dump housing which can maintain the vacuum suction created by the negative pressure in the loader and auger assembly.

A further advantage of the present invention is that it provides an improved high efficiency auger airlock assembly and end dump housing which limits the opportunity for outside air to enter the discharge port from the sides of the port upon the discharge of materials, thus preserving the integrity of the overall negative pressure system and maintaining the negative pressure situation in the loader and the auger assembly.

Yet another advantage of the present invention is that it provides an improved auger airlock assembly and end dump housing which restricts the direction in which materials are discharged downwardly from the end of the discharge port.

BRIEF DESCRIPTION OF THE DRAWINGS

A preferred embodiment of the present invention is described below with reference to the accompanying drawings, in which.

DESCRIPTION OF THE PREFERRED EMBODIMENT

Figure 1A:
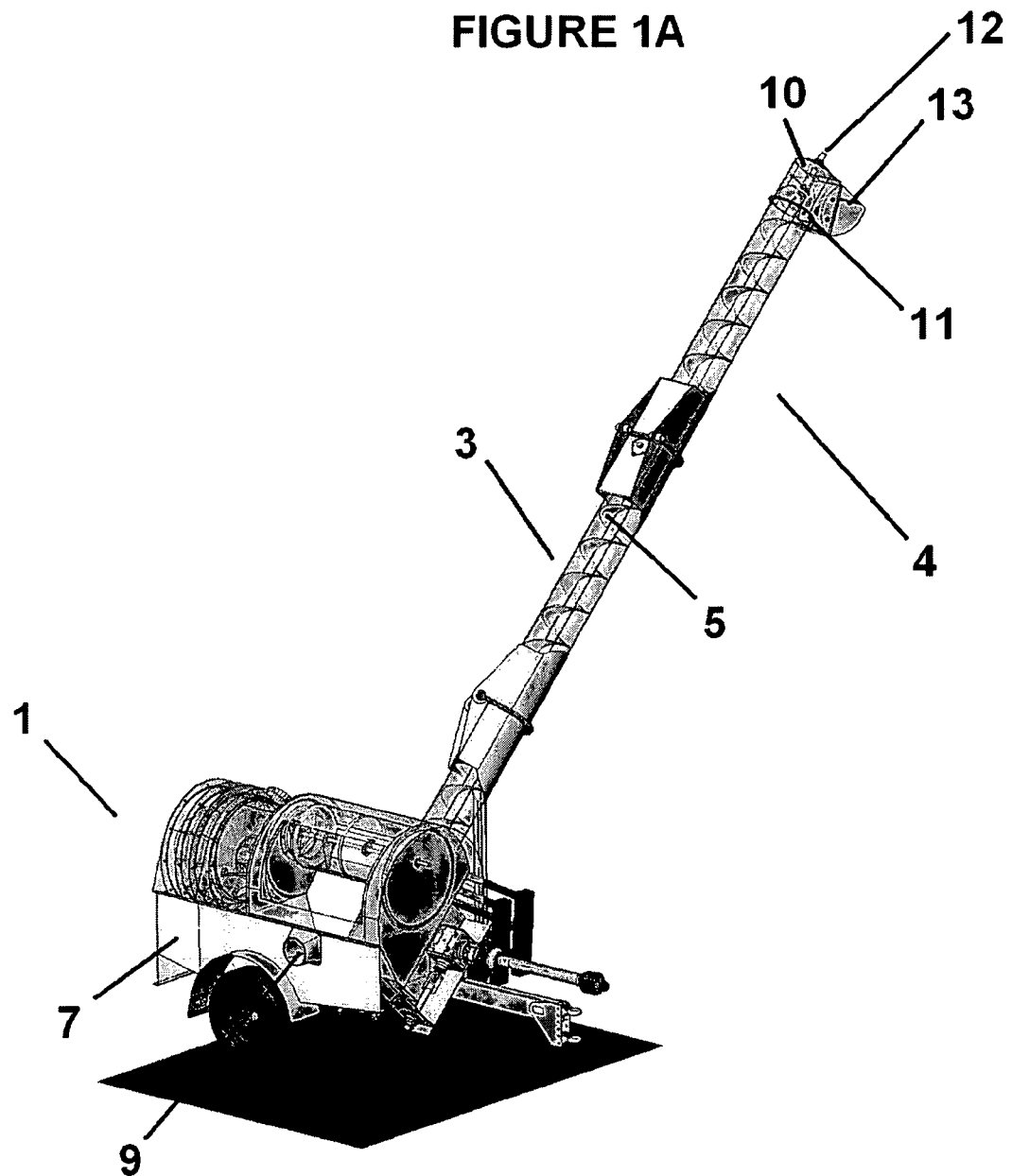
FIG. 1A is a partial perspective "see through" view of a conventional bulk loader shown utilizing an embodiment of the auger airlock assembly and end dump housing of the present invention.
Figure 1B:
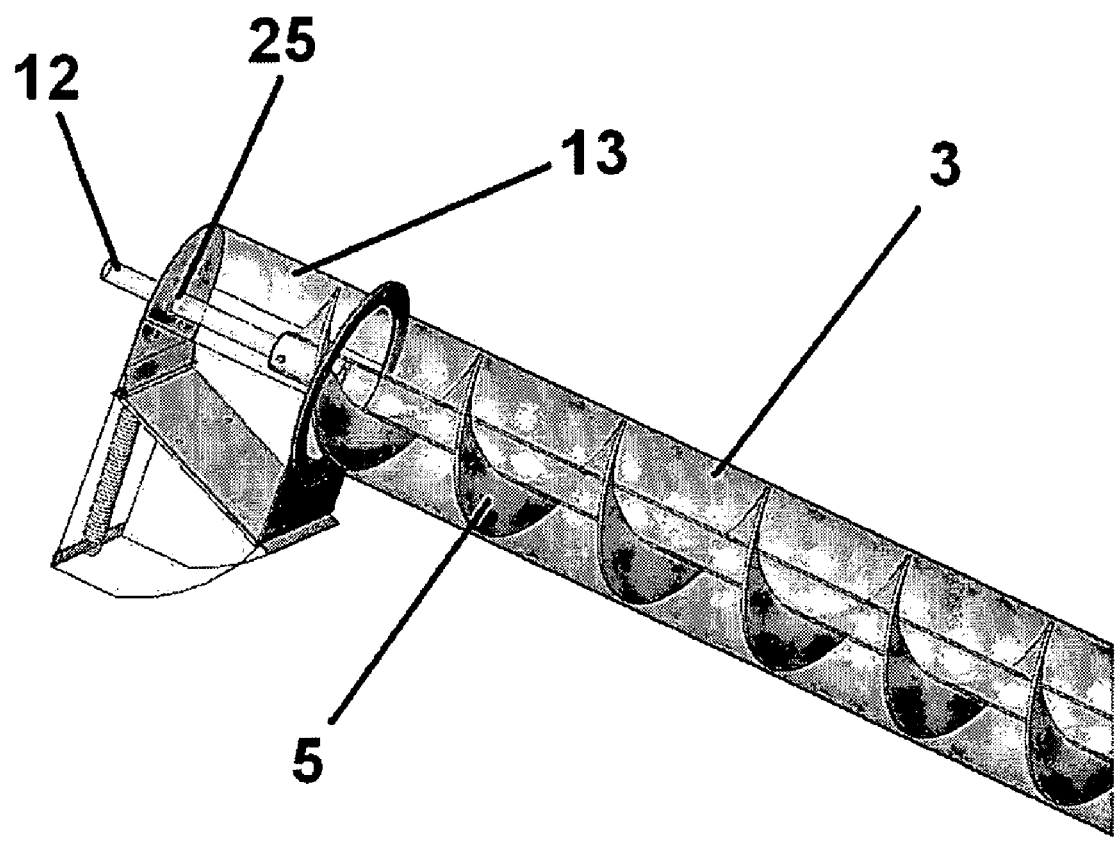
FIG. 1B is a close-up partial perspective "see through" view of the end of the auger airlock assembly and end dump housing of the present invention.

FIG. 1A broadly illustrates a conventional example of a bulk loader (1) utilizing an auger airlock assembly and end dump housing in accordance with the present invention. As is known in the art, such bulk loaders utilize a blower or fan to create a source of negative pressure for forming a suction air stream that draws particulate or granular materials through a hose into the loader for subsequent transfer, via an auger assembly, to a location remote of the loader. The bulk loader shown in FIG. 1A provides an inlet (9) in a sidewall of the body (7) which is adapted to be connected with an intake hose or conduit (not shown) so that particulate or granular materials may be drawn, by suction, through the hose and passed into the interior of the bulk loader, for transferral to the auger airlock assembly of the present invention (indicated generally as "4"), which, in a preferred embodiment, includes an elongated material conveying tube or barrel (3), and an elongated, axially rotatable material conveying auger (5) situated within the tube or barrel (3). It can be seen in FIG. 1A that, in a preferred embodiment, the auger airlock assembly (4) is inclined upwardly and outwardly away from the body (7). With reference to FIG. 1B, the auger shaft (12) can extend freely through an auger shaft receiving opening (25) in the end dump assembly (13). Alternatively, and with reference again to FIG. 1A, the auger assembly (4), can be provided with an outer end plate (10) serving to close off the outermost end of the auger assembly (4), this being on the outermost end of shaft (12) of auger (5).

Of course, particulate or granular materials received by inlet (9) are continuously advanced by the auger airlock assembly (4) upwardly and outwardly away from the body (7) toward the outermost end (11) of the tube or barrel (3) for transferral therefrom to, for example, an awaiting truck or other receptacle. An end dump assembly (13) in accordance with the present invention is positioned at and connected to the outer end (11) of the tube and directs particulate or granular materials to be transferred to a location remote from the loader (as hereinafter described), it being understood that particulate or granular materials can encompass, for example, grain or agricultural products, fertilizer, chemicals, or other smaller particulate matter such as styrofoam packing chips or material, glass beads, or other materials which would be apparent to a worker skilled in the art.

Figure 2:
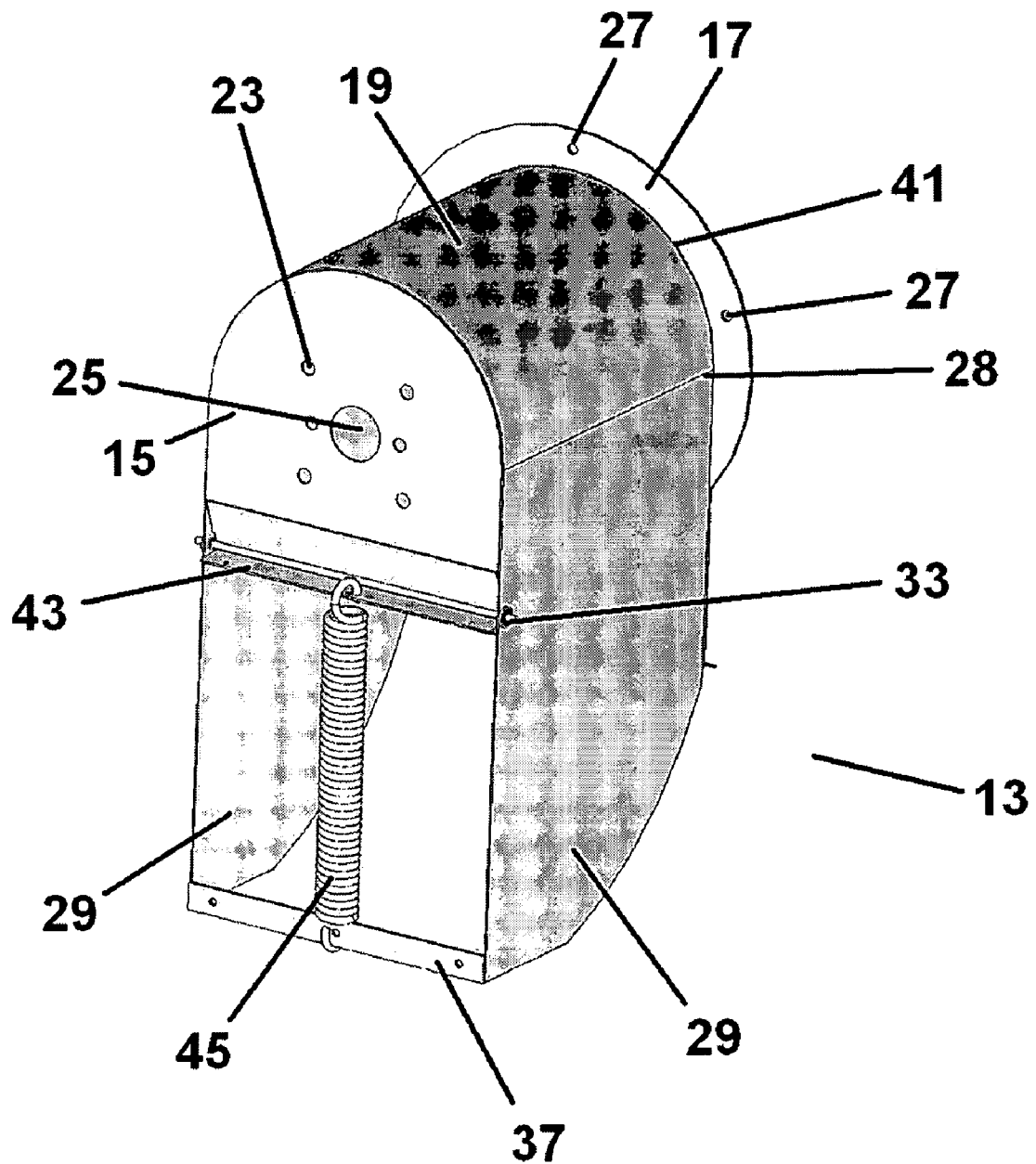
FIG. 2 is a front perspective "see through" view of an embodiment of the end dump housing of the present invention.

FIG. 2 illustrates an embodiment of a material-conveying end dump assembly (13), (hereinafter referred to as a "housing"), in accordance with the present invention, which is adapted to cover the outer end (11) of the tube (3). Thus, it will be appreciated that, when the outermost end of the shaft (12) of auger (5) passes through the auger shaft receiving opening (25), or is secured to the front wall (15), and the rear wall (17) of the housing has been attached to the outer end (11) of the tube (3), the end of the auger assembly is contained substantially within the housing, as can be seen with reference to FIGS. 1A and 1B. In this manner, particulate or granular materials advanced by the auger out of the outermost end (11) of the tube or barrel (3) will enter into the housing for discharge, as hereinafter described.

The housing, in a preferred embodiment, consists of a front wall (15) and a rear wall (17) being joined, and separated by, a covering panel (19), which essentially provides the "roof" for the housing (13). As can be seen with reference to FIGS. 2, 3, 4 and 5 the front wall (15) further comprises a number of securing holes (23) defined therein for receiving securing bolts, if the alternative embodiment is used for attachment of the outer end and bearing plate (10) of the auger assembly (4) shown in FIG. 1 to the front wall (15), it being understood that various configurations could be alternatively effected for this attachment, as would be apparent to a worker skilled in the art. As can also be seen, a larger auger shaft receiving opening (25) is defined therein on the front wall (15), for receiving therethrough the outermost end of shaft (12) of auger (5).

Figure 3:
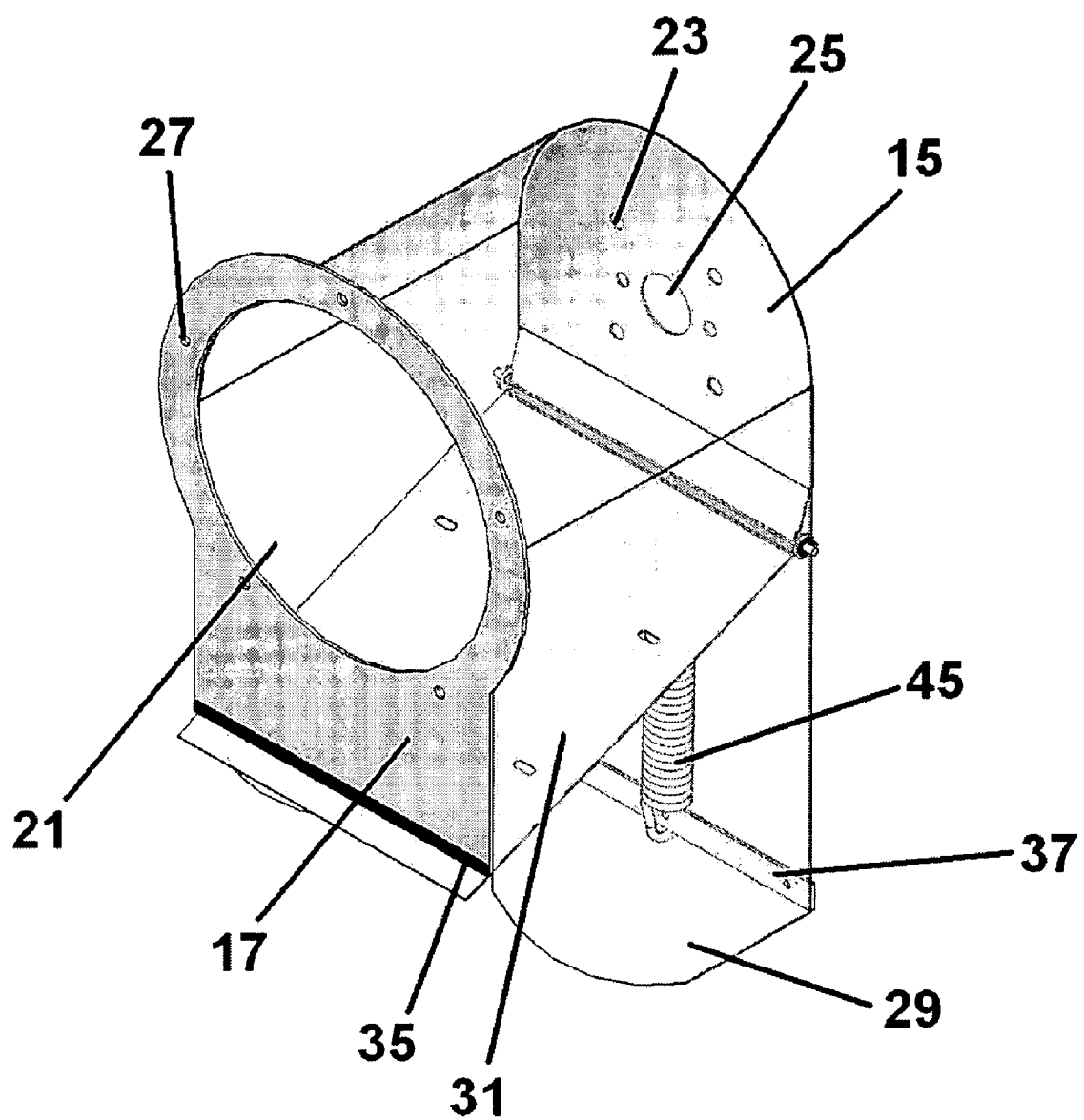
FIG. 3 is a rear perspective "see through" view of the embodiment of the end dump housing shown in FIG. 2.

With reference to FIG. 3, the rear wall (17) is placed so as to cover the outer end (11) of the tube (3), and defines an inlet port (21) therein, the inlet port (21) being in communication with the outer end (11) of the tube (3) for receiving the material delivered from the auger (5). As can be seen with reference to FIGS. 2, 3 and 4, the rear wall (17) further comprises a plurality of mounting holes (27) defined therein, which are arranged around the outer periphery of the rear wall, for allowing attachment of the rear wall (17) of the housing to the outer end (11) of the tube (3), for example by bolts, screws or other configurations, as would be apparent to a worker skilled in the art.

Figure 4:
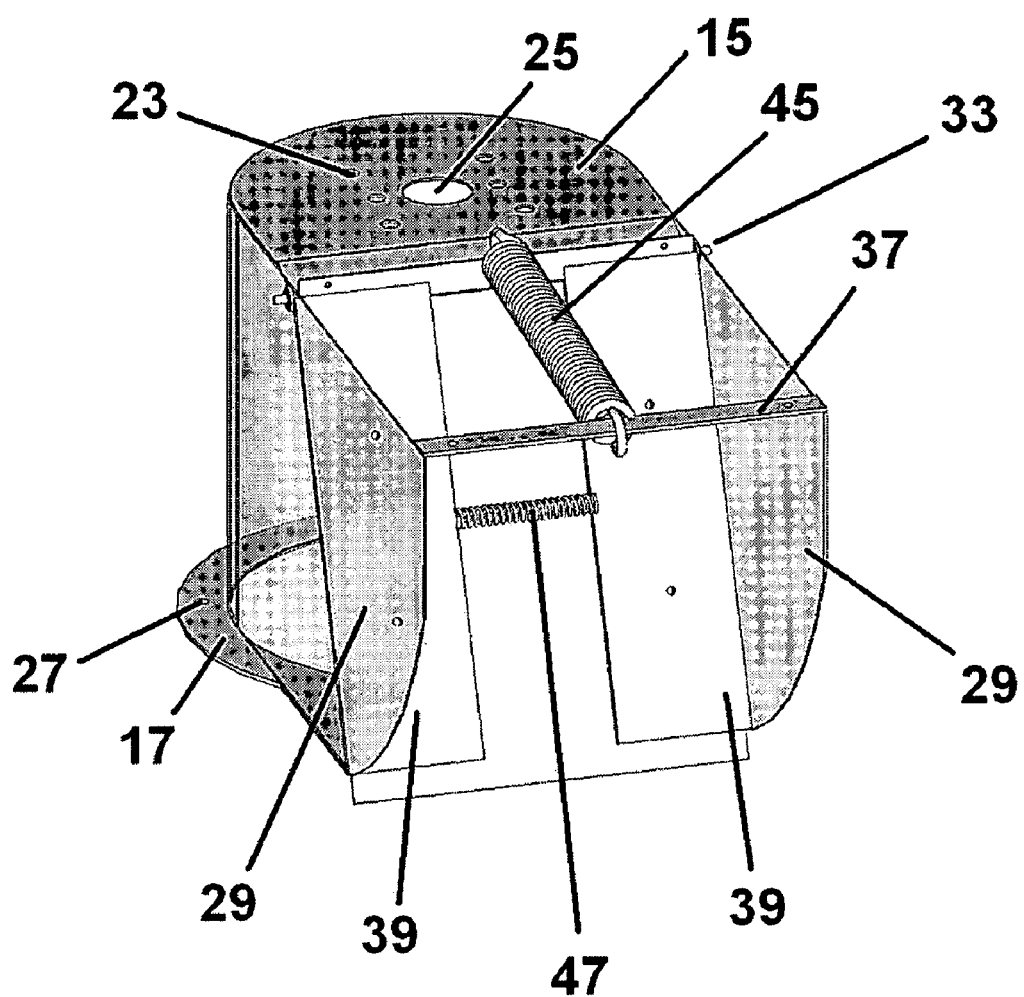
FIG. 4 is a bottom perspective "see through" view of another embodiment of the end dump housing of the present invention.
Figure 5:
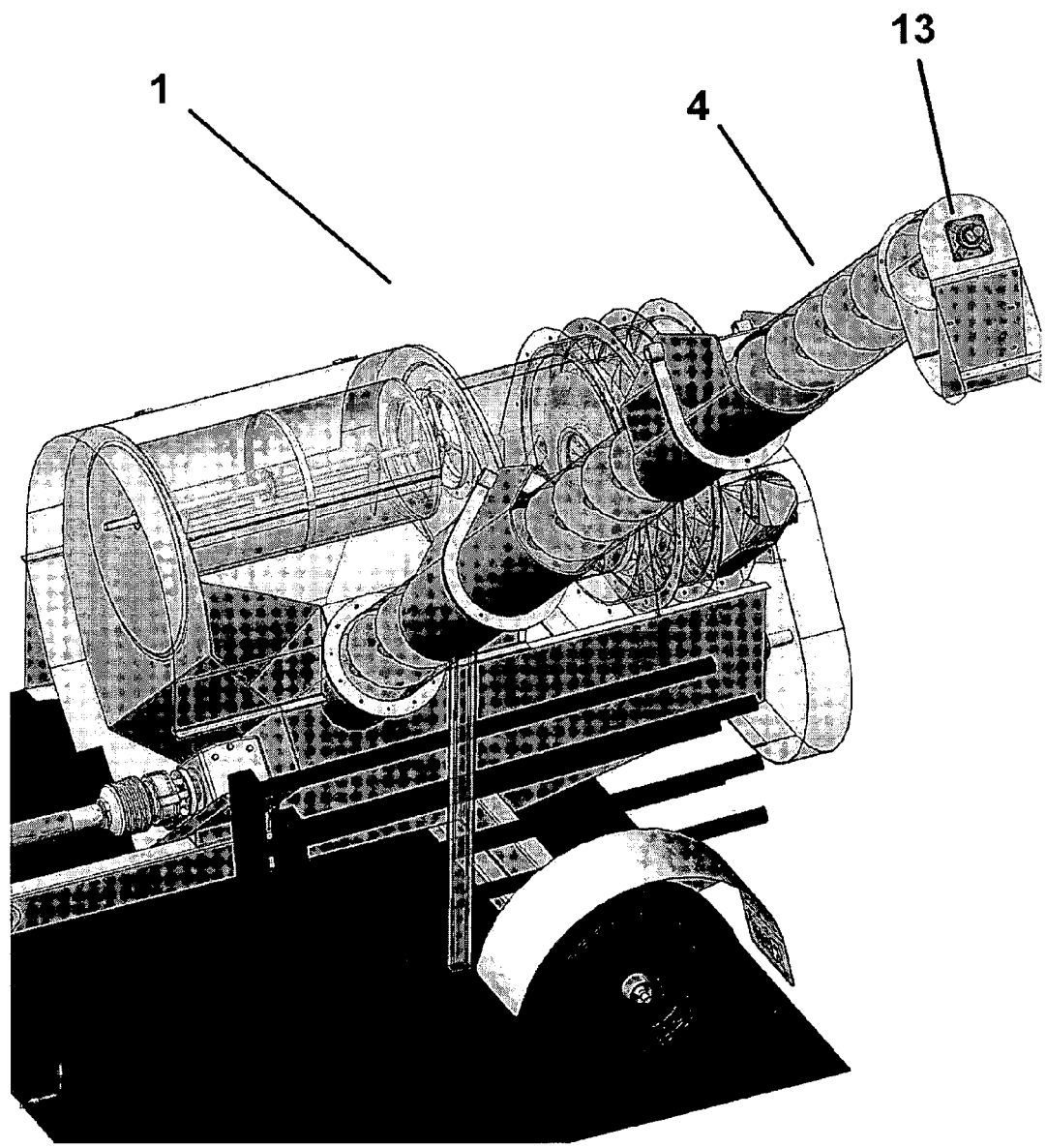
FIG. 5 is a partial perspective "see through" view of a conventional bulk loader shown utilizing an embodiment of the auger airlock assembly and end dump housing of the present invention.

With reference to FIGS. 2, 3 and 4, the housing (13) will also preferably have a bottom wall (31) being hingedly connected (33) thereto, the bottom wall (31) being able to open or close the housing (13) as will hereinafter be described. A restrictive bar (37) extends laterally between the side portions (29) of the housing, which acts to prevent the opening of the bottom wall (31) beyond the restrictive bar when discharging material from the housing. A spring (45) is connected to extend between the restrictive bar (37) and the end (43) of the bottom wall, as shown in FIG. 2. The spring (45) of course, applies a load to normally keep the bottom wall in a closed position. In a preferred embodiment, particulate or granular materials discharged by the auger airlock assembly (4) out of the outermost end (11) of the tube or barrel (3), pass through the inlet port (21) in communication therewith, and accumulate within the housing (13) on an upper surface of the bottom wall (31). The opening of the bottom wall (31) thus depends upon the weight of the material accumulating in the housing, and the load applied by the spring to keep the door closed. As material to be discharged will continue to accumulate in the housing until the weight of the accumulated material reaches that weight necessary to force open the bottom wall of the housing, whereupon the bottom wall (31) will swing to an open position thereby allowing the discharge of material from the housing to, for example, an awaiting truck or other receptacle. Of course, the force applied by the auger in feeding material into a full housing will compress the material and force the bottom wall (31) open. As noted previously, the opening of the bottom wall (31) thus depends upon the weight of the material accumulating in the housing, and the load applied by the spring to keep the door closed. When material is no longer being sent in sufficient amounts to maintain the bottom wall (31) in the open position, the spring (45) biases the bottom wall (31) back into a position to close the entrance to the housing (13).

It will, of course, be apparent to a worker skilled in the art that the weight of the accumulated material necessary to force open the bottom wall of the housing can be varied, and depends upon, for example, the weight of the bottom wall and the resiliency of the spring which is utilized. Of course, once the spring (45) biases the bottom wall (31) back into the position to close the housing (13), the closed housing (13) excludes a substantial entry of outside air into the housing (13), and the attached tube (3), thus inhibiting diminution of the strength of the negative pressure in the loader and in the auger airlock assembly. In a preferred embodiment, the hinged connection (33) of the bottom wall is attached to a bottom surface of the front wall (15), as seen with reference to FIG. 2, however, it would also be apparent to one skilled in the art that the hinged connection could also be effected to a bottom surface of the rear wall or side walls.

The covering panel (19), as noted previously, essentially provides the "roof" for the housing (13) and is connected to each of the front and rear walls, substantially along the top and side edges of the front wall (15), and at least along side edges of the rear wall (17), and along a top edge of the rear wall which corresponds to the inner edge (41) of the outer end of the tube, as seen in FIG. 2. The covering panel (19) can be, in one embodiment, an upper covering panel (19) having two side portions (29) which are attached (28) to each side end of the panel (19), as can be seen with reference to FIGS. 2 and 3, which effectively provide side walls for the housing. In an alternative embodiment, the entire covering panel can be a one piece formed panel. In the embodiment of the present invention shown in FIGS. 2 and 3, the upper portions of the front wall (15) and rear wall (17) are arcuate surfaces, and thus, the covering panel (19) is likewise curved or "bent" when placed so as to connect the front and rear walls. In another embodiment, the covering panel (19), side walls and front and rear walls are of a square configuration.

It is, of course, understood that various other configurations could be effected also, as would be apparent to a worker skilled in the art. In a preferred embodiment, the length of side portions (29) of the covering panel (19) exceeds the length of the front wall (15) and the rear wall (17). In the preferred embodiment, the lower ends of the covering panel extend beyond the lower edges of the front and rear walls to provide extender walls alongside the opened the opened or partially opened bottom wall, as can be seen with reference to FIG. 2, so that during the gravitational discharge of materials when the bottom wall (31) of the housing has opened, the extended side portions (29), in conjunction with and substantially abutting the opened or partially opened bottom wall, reduce the unimpeded entry of outside air into the housing (and correspondingly attached tube), thus inhibiting diminution of the negative pressure in the loader and in the auger airlock assembly. In one alternative embodiment of the present invention, at least one of the side portions (29) is formed of a transparent material or, alternatively, each of the side portions are formed of a transparent material, for allowing observation of the discharging material.

The housing, with reference to FIG. 3, further comprises a resilient flap (35) which is connected to a bottom surface of the rear wall (17), the flap extending laterally to encompass a complete distance between each of the side portions (29). The resilient flap acts to restrict the unnecessary removal of material from the housing (13), and also acts as a soft seal, as the flap (35) contacts an upper surface of the bottom wall (31) when the spring biases the bottom wall (31) back into a closed position, to further assist in inhibiting the entry of outside air into the housing (13).

With reference to FIG. 3, bottom surfaces of the bottom wall (31) which abut the side portions can include friction strips (or wear strips), which, will further lightly inhibit the easy opening of the bottom wall (31) when materials are being discharged from the housing, by rubbing lightly against the inside surfaces of the side portions (29) as the bottom wall (31) opens. In a preferred embodiment, and with reference to FIG. 4, a tension spring (47) can be used so as to provide a constant force to abut the strips (39) against the inside surfaces of the side portions (29). As an example, the strips will, preferably, require an additional pressure of 1 psi to be exuded on the inside surfaces of the side portions (29) by the discharging material for the bottom wall to open. These strips (39) will, preferably, extend along a length of each outside edge of the bottom wall (31), and may provide an additional seal to further limit the unimpeded entry of outside air into the housing and loader. The strips may be adhered to the bottom surface of the bottom wall (31) by screws, or by other means which would be apparent to a worker skilled in the art.

In an alternative embodiment, and as seen in FIG. 4, the housing (13) may also be provided with a restrictive bar (37), which acts to prevent the opening of the bottom wall (31) beyond the restrictive bar when discharging material from the housing. The bar will, preferably, extend laterally between, and be connected to, each of the side portions (29), such connection occurring on a lower portion of the side portions (29). In the embodiment shown in FIG. 2, this restrictive bar (37) extends laterally between the ends of the side portions (29). Of course, it will understood that the degree to which the restrictive bar (37) restricts the opening of the bottom wall (31) will be dependent upon how low the bar is connected on the lower portion of the side portions (29); if the bar is placed higher on the lower portion of the side portions, then the opening of the bottom wall (31) will likewise be restricted to opening to a somewhat narrow radius. If the bar is placed towards the lower portion of the side portions, then the opening of the bottom wall (31) will accordingly allow the bottom wall (31) to opening to a greater degree.

The present invention has been described herein with regard to preferred embodiments. However, it will be obvious to persons skilled in the art that a number of variations and modifications can be made without departing from the scope of the invention as described herein.

The embodiments of the invention in which an exclusive property or privilege is claimed are defined as follows:

1. A conveying end dump assembly comprising:
   a housing having a receiving port for being connected to an end portion of a conveying mechanism for receiving particulate materials therefrom and a discharging port for discharging the particulate materials, the conveying mechanism being operated at a pressure lower than an outside air pressure; and,
   a sealing mechanism for sealing the discharging port in a substantially airtight fashion to substantially prevent entry of outside air into the housing when in a closed position and for opening in dependence upon a predetermined amount of the particulate materials to enable discharge of the particulate materials.

2. A conveying end dump assembly as defined in claim 1 wherein the sealing mechanism comprises a seal, the seal for opening after accumulation of the predetermined amount of the particulate materials thereupon.

3. A conveying end dump assembly as defined in claim 2 wherein the seal comprises a plate made of a rigid material and pivotally movable mounted to the housing.

4. A conveying end dump assembly as defined in claim 3 wherein the plate is biased using a spring load.

5. A conveying end dump assembly as defined in claim 1 comprising a shield mounted to the housing for reducing entry of outside air when the sealing mechanism is opened.

* * * * *